United States Patent [19]

Repplinger et al.

[11] Patent Number: 5,203,021

[45] Date of Patent: Apr. 13, 1993

[54] TRANSPORTABLE SUPPORT ASSEMBLY FOR TRANSCEIVER

[75] Inventors: Daniel J. Repplinger, Lake Zurich; Gary R. Weiss, Wheeling, both of Ill.

[73] Assignee: Motorola Inc., Schaumburg, Ill.

[21] Appl. No.: 600,946

[22] Filed: Oct. 22, 1990

[51] Int. Cl.⁵ .................. H04B 1/08; H04B 1/38; H01R 13/62
[52] U.S. Cl. ............................ 455/90; 455/348; 455/351; 439/297
[58] Field of Search ................ 361/391, 422, 424; 455/89, 90, 344, 345, 346, 347, 348, 349, 351; 439/297, 298, 345, 347, 372

[56] References Cited

U.S. PATENT DOCUMENTS

| | | | |
|---|---|---|---|
| 4,141,616 | 2/1979 | Gottlieb | 439/297 |
| 4,286,335 | 8/1981 | Eichler et al. | 455/90 |
| 4,876,552 | 10/1989 | Zakman | 455/89 |
| 4,881,258 | 11/1989 | Kaiwa et al. | 379/58 |
| 4,912,602 | 3/1990 | Zurek et al. | 455/90 |

Primary Examiner—Reinhard J. Eisenzopf
Assistant Examiner—Lisa Charouel
Attorney, Agent, or Firm—Robert H. Kelly

[57] ABSTRACT

A support assembly for a transportable radiotelephone. The support assembly forms a transceiver unit receiving platform which supportively affixes a transceiver unit in position thereat when positioned thereat. Connection with a battery supply, a handset, and an antenna is formed by merely properly positioning the transceiver unit at the transceiver unit receiving platform.

19 Claims, 3 Drawing Sheets

TRANSPORTABLE SUPPORT ASSEMBLY FOR TRANSCEIVER

BACKGROUND OF THE INVENTION

The present invention relates generally to support apparatus, and, more particularly, to a transportable support assembly for supporting a transceiver unit therefrom.

The infrastructure required to form a cellular communication system is comprised of numerous base stations which are positioned at spaced-apart locations throughout a geographical area. Each of the base stations contains circuitry to receive and to transmit radio-frequency, modulated information signals. A base station receives modulated information signals which are generated and transmitted by transceivers (e.g., cellular phones) positioned within the reception range of at least one of the base stations. A base station generates and transmits modulated information signals to transceivers positioned proximate to the base station. Because the signals transmitted between the base station and a transceiver are modulated at a radio-frequency, the base station and the transceiver need not be physically interconnected to permit communication therebetween. For this reason, telephonic communication is permitted at virtually any location in the geographical area in which a cellular communication system is installed. By proper selection of the locations at which the individual ones of the base stations are located, a transceiver positioned at any location throughout the geographical area is within the reception range of at least one of the base stations.

Each base station defines a portion of the geographical area. In a cellular communication system, such a geographical area is referred to as a cell, and numerous cells are defined by the spaced-apart base stations.

A portion (referred to as a frequency band) of the electromagnetic frequency spectrum is allocated for cellular communications. In the United States, the frequency band allocated for cellular communications extends between 800 MHz and 900 MHz. More particularly, a portion of the allocated frequency band, extending between 824 MHz and 849 MHz is allocated for the transmission of modulated information signals from a transceiver to a base station. Another portion, extending between 869 MHz and 894 MHz of the allocated frequency band is allocated for the transmission of modulated information signals from a base station to a transceiver.

Each portion of the allocated frequency band is divided into a plurality of transmission channels. Existing United States cellular communication systems define transmission channels of 30 KHz bandwidths. 832 transmission channels are defined in each portion of the allocated frequency band. At least 832 two-way communications may be effectuated in such a system. By suitable selection of the positions at which the base stations are located, individual ones of the transmission channels may be reused, thereby increasing the number of two-way communications which may be simultaneously transmitted in a cellular system.

Signals generated and transmitted by both the transceivers and the base stations of the cellular system are low-power signals; therefore, signals transmitted by a transceiver or a base station at a location not adjacent, or otherwise proximate, to a base station or transceiver located at a distant portion of the geographical area in which the cellular system is installed are not detected by the distant base station. Therefore, the transmission channels over which the signals are transmitted in one portion, i.e., cell, of the geographical area may be reused. Proper selection of the locations at which the base stations are positioned permits the limited number (in the United States, e.g., 832) of transmission channels defined over the allocated frequency band to be reused many times.

The base stations are connected to a conventional telephone system to permit signals transmitted to individual ones of the base stations to be transmitted therealong. Similarly, the user of a conventional telephone system transmits signals to the individual ones of the base stations according to conventional methods, and, as the signal is received at an individual one of the base stations, the signal is modulated and transmitted to a transceiver positioned in the cell defined by the individual one of the base stations.

While a user may communicate telephonically through a cellular communication system when situated at any fixed location in the geographical area encompassed by the cellular communication system, telephonic communication is additionally permitted when the transceiver is positioned in an automobile, or other vehicle, which is traveling through one or more of the cells of the cellular system. Continuous communication is permitted of an operator of a transceiver traveling in a vehicle as the vehicle passes from one cell to an adjacent cell by a process referred to as "handing off" in which the signal transmitted by the transceiver is received by the base station of the cell in which the vehicle enters. When carried in a vehicle, a transceiver forming a cellular phone is referred to as a mobile phone. As the vehicle in which the mobile phone is positioned travels through successive cells, the signals transmitted by the mobile phone are received by successive base stations to permit continuity of telephonic communication.

Initially, mobile phone constructions were of significant dimensions and weights. In fact, in many instances, the phone constructions were of such large dimensions that substantial portions of the phones were placed in a trunk, or other storage area, of the vehicle. Such constructions were, in many instances, installed in a vehicle only with significant difficulty, and, once installed, were considered to be permanently affixed to the vehicle.

Technical improvement in cellular phone construction has resulted in progressively smaller phone designs. In fact, some cellular phone constructions are now of dimensions and weights to permit their carriage by individuals. For instance, some mobile phone constructions, although primarily intended for use in a vehicle, are of dimensions and weights to permit their carriage by a user to permit communication therewith when positioned away from a vehicle.

Typically, a cellular phone is comprised of a first portion forming a transceiver unit comprising transmit/receive circuitry housed within a housing, a second portion comprised of a handset supporting a speaker element and a microphone, and a power supply portion. A mobile phone mounted in a vehicle typically is connected to the vehicular power supply to powered thereby. When removed from vehicle and positioned remote therefrom, an alternate source of power must, of course, be supplied to the phone to permit operation thereof.

Battery power sources required to provide power to operate the cellular phones have similarly been increasingly miniaturized also to be now of dimensions and weights to permit their carriage by an individual.

While increased miniaturization of the cellular phones have resulted in cellular phone constructions of dimensions and weights permitting their carriage by an individual, because a mobile phone is comprised of discrete component portions (namely, as mentioned hereinabove, the transceiver unit, the handset, and the battery power supply) such carriage by an individual can be quite cumbersome.

As a result, various support apparatus have been utilized to facilitate carriage of the various component portions of the mobile phone once removed from a vehicle. Most simply, the portions may be placed within a bag-like structure having handle straps affixed thereto. By placing the component portions of the mobile phone in the bag-like structure, the phone may be carried by a user by grasping the handle-straps and thereafter lifting the bag-like structure. However, to effectuate operation of the phone, the handset portion of the phone must be removed from the bag-like structure, and an antenna portion of the transceiver unit must be positioned to allow transmission and reception of modulated information signals.

Other transportable support assemblies have been developed in which the phone component portions are affixed thereto. However, such support assemblies require extensive installation procedures to affix the component portions of the phone to the support assembly, and to complete and maintain the necessary connections between the discrete component portions.

What is needed, therefore, is a support assembly for forming a transportable phone of a cellular phone having discrete component portions which permits simple and quick connection of the component portions thereto.

SUMMARY OF THE INVENTION

It is accordingly an object of the present invention to provide a support assembly for a cellular phone comprised of discrete component portions.

It is a further object of the present invention to provide a transportable support assembly for a transceiver unit which permits quick and convenient affixation of the transceiver unit thereto.

It is yet a further object of the present invention to provide a transportable radiotelephone construction comprised of discrete component portions releasable affixed to a support assembly.

In accordance with the present invention, a transportable support assembly permitting carriage of a transceiver unit having an interface element forming a portion thereof by a user when the transceiver unit is supported therefrom is disclosed. The transportable support assembly supportively positions the transceiver unit at a support position, releasably affixes the transceiver unit when positioned at the support position to affix the transceiver unit in position thereat, and includes an interface connector for releasably engaging with the interface element of the transceiver unit when the transceiver unit is positioned at the support position, whereby the interface connector engages with the interface element when the transceiver unit is positioned at the support location, and disengages from the interface element when the transceiver unit is released from the support position.

BRIEF DESCRIPTION OF THE DRAWINGS

The present invention will be better understood when read in light of the accompanying drawings in which.

DESCRIPTION OF A PREFERRED EMBODIMENT

Figure 1:
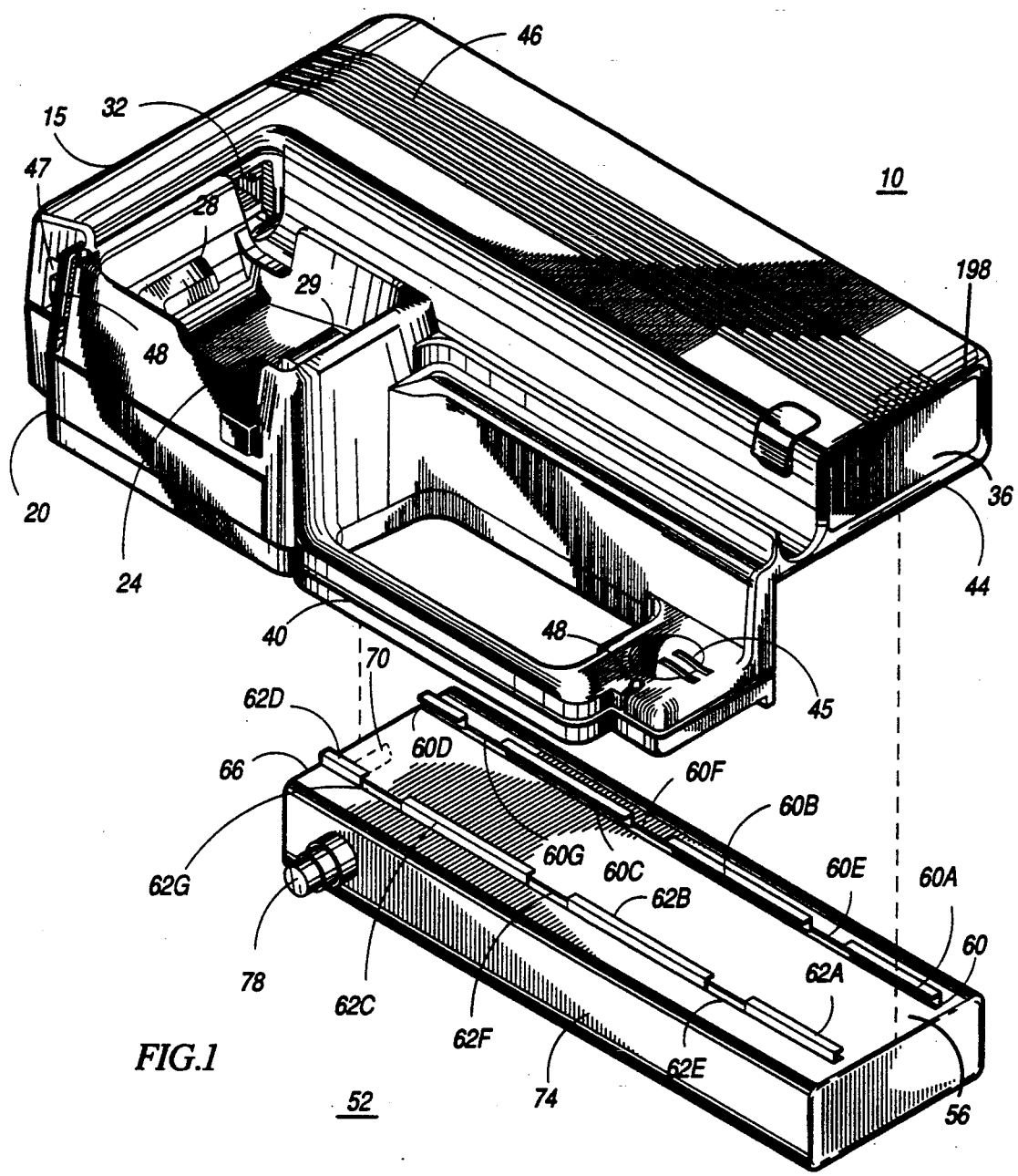
FIG. 1 is an exploded, perspective view of the transportable support assembly of the present invention taken together with a transceiver unit which may be releasably affixed to the transportable support assembly.

Referring first to the exploded perspective view of FIG. 1, there is shown the transportable support assembly referred to generally by reference numeral 10, of the present invention. Support assembly 10 is comprised of top portion 15 and bottom portion 20. Top and bottom portions 15 and 20 of support assembly 10 are preferably formed of a thermoplastic material, such as, for example, "ABS-LEXAN" (TM). Top and bottom portions 15 and 20 are preferably formed by a molding process, and once formed, are positioned such that mated face surfaces of the respective portions 15 and 20 are positioned in a confronting relationship and fastened theretogether by any conventional means. Top portion 15 includes a recessed area 24 forming a handset receiving area permitting placement of a portion of a conventional, telephonic handset thereat. Created to work in conjunction with recessed area 24 are latches 28 and 29 having latching surfaces formed thereupon. Latches 28 and 29 permit latching engagement with corresponding, mated surfaces formed on a handset when positioned thereat to releasably affix the handset thereto. Opening 32 formed on an inner wall of top portion 15 of support assembly 10 permits insertion of connector prongs of the telephonic handset.

Top portion 15 of assembly 10 is molded to form a longitudinally-extending, internal cavity having an opening on a side face surface of portion 15 which forms a battery receiving chamber 36 thereby. Battery receiving chamber 36 permits insertion of a battery element therein. A conventional battery element for powering a transceiver is of a rectangular configuration and contains anode and cathode electrodes formed on a face surface thereof. Electrodes (not shown) positioned on a surface of portion 15 forming chamber 36 correspond to the battery element electrodes. Suitable insertion and positioning of the battery element into battery receiving chamber 36 positions the battery element such that the battery element electrodes and the electrodes positioned on the surface portion of portion 15 abut against one another to be interconnected thereby. The electrodes positioned upon the surface of portion 15 are connected to wiring which, as will be described hereinbelow, provides a circuit path to provide power to permit operation of a transceiver unit when suitably positioned at the support assembly 10.

Top portion 15 of support assembly 10 is additionally molded to form a portion of handle 40, thereby forming a hand-hold for permitting grasping thereof by a user.

Bottom portion of support assembly 10 forms a second portion of handle 40.

Bottom portion 20 is additionally molded to form a three-sided transceiver unit receiving platform 44 of dimensions permitting positioning of a transceiver unit thereat. FIG. 1 further illustrates microphone 45 and speaker 46 positioned directly beneath a surface of portion 15, socket 47 to permit connection to an external power supply (not shown), and slots 48 permitting connection thereto of a carry strap (not shown).

A transceiver unit, referred to generally by reference numeral 52, which may be positioned at transceiver unit reciving platform 44 of the support assembly 10 of FIG. 1 to be affixed to the support assembly 10 thereat is also shown in the figure. Transceiver unit 52 contains transmit/receive circuitry housed within a generally rectangular housing. Top face surface 56 of transceiver 52 includes tracks 60 and 62 which extend longitudinally therealong. Tracks 60 and 62 are spaced-apart by a predefined distance. Preferably, and as illustrated, track 60 is comprised of tandemly-positioned track portions 60A, 60B, 60C, and 60D. Similarly, track 62 is preferably comprised of tandemly-positioned track portions 62A, 62B, 62C, and 62D. Gap 60E separates tandemly-positioned track portions 60A and 60B. Gap 60F separates tandemly-positioned track portions 60B and 60C, and gap 60G separates tandemly-positioned track portions 60C and 60D. Gap 62E separates tandemly-positioned track portions 62A and 62B, gap 62F separates tandemly-positioned gap portions 62B and 62C, and gap 62G separates tandemly-positioned track portions 62C and 62D. Cross sections of each of the track portions 60A-60D and 62A-62D are L-shaped in configuration for reasons to be discussed more fully hereinbelow.

Front face surface 66 of transceiver unit 52 has mounted thereupon a connector element 70, shown in hatch, which preferably, and as illustrated, is comprised of a conventional RS-232 connector. Connector element 70 permits connection of the transmit/receive circuitry housed within the housing of the transceiver unit 52 with external circuitry.

Mounted upon side surface 74 of the housing of transceiver unit 52 is antenna connector 78. Antenna connector 78 is preferably, and as illustrated, comprised of a coaxial connector for providing connection of antenna leads of the transceiver unit 52 transmit/receive circuitry to external circuitry, namely an antenna.

Figure 2:
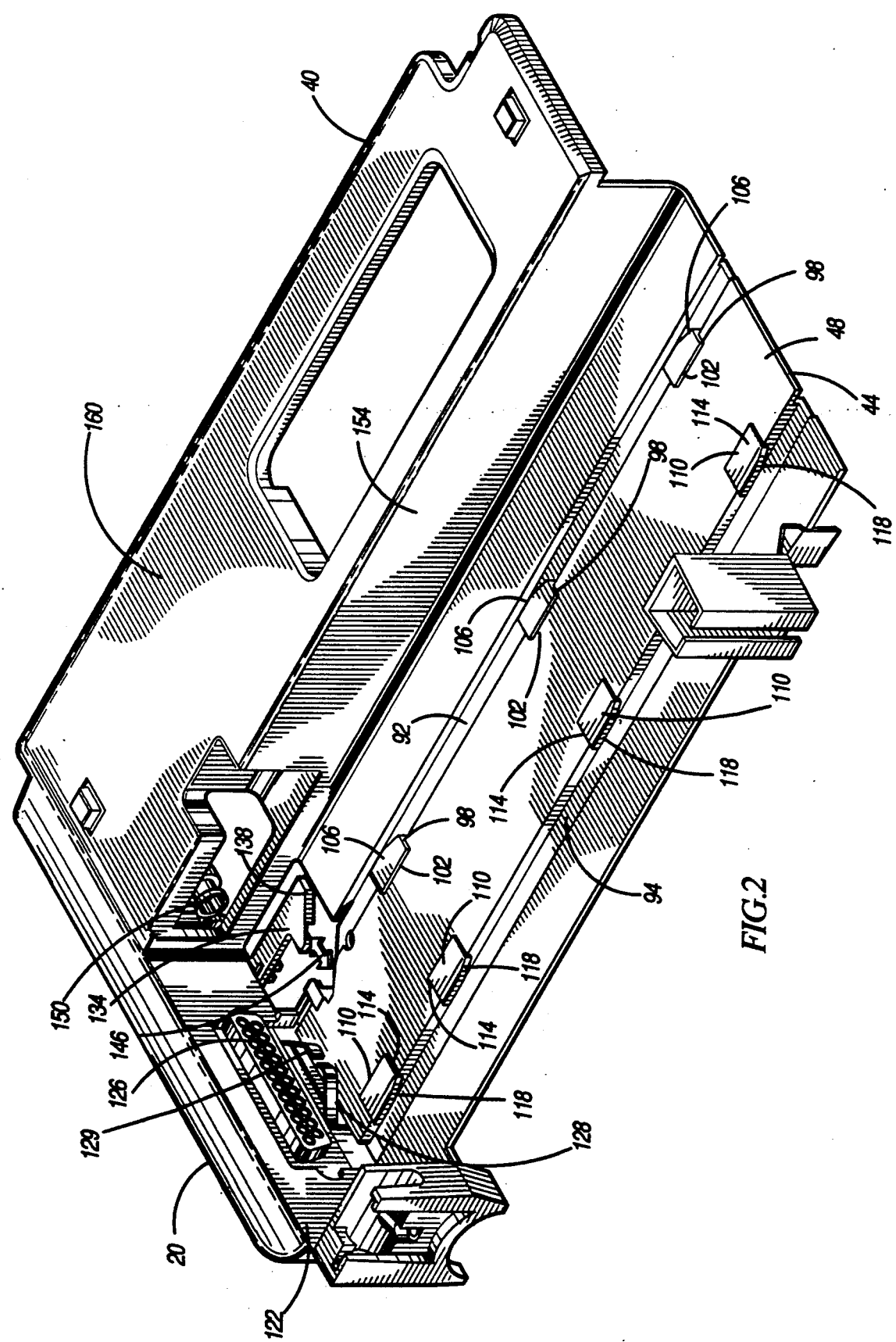
FIG. 2 is a cut-away view of a portion of the transportable support assembly shown in FIG. 1, but taken from a second angle.

FIG. 2 is a cut-away view of a portion of the transportable support assembly 10 taken from a second angle. The view of FIG. 2 illustrates receiving platform 44 formed upon bottom portion 20 of support assembly 10. Formed along the face of surface 48 of assembly 10 are longitudinally-extending grooves 92 and 94. Grooves 92 and 94 are aligned at a pre-determined, spaced-apart relationship from one another. The distance separating grooves 92 and 94 corresponds to the distance separating tracks 60 and 62 formed on surface 56 of the housing of the transceiver unit 52. Raised, mounting tabs 98 having top face surfaces 102 extending above the plane of surface 48 and side surfaces 106 which protrude from a side wall which defines groove 92. Similarly, raised, mounting tabs 110 having top face surfaces 114 extending above the plane of surface 48 have side surfaces 118 which protrude from a sidewall which defines groove 94. Top face surfaces 102 of mounting tabs 98 and top face surfaces 114 of mounting tabs 110 extend to similar heights above the plane of surfaces 48. Side surfaces 106 of mounting tabs 98 and side surfaces 118 of mounting tabs 110 each contain angled portions extending from respective sidewalls which define the respective grooves 92 and 94.

Figure 3:
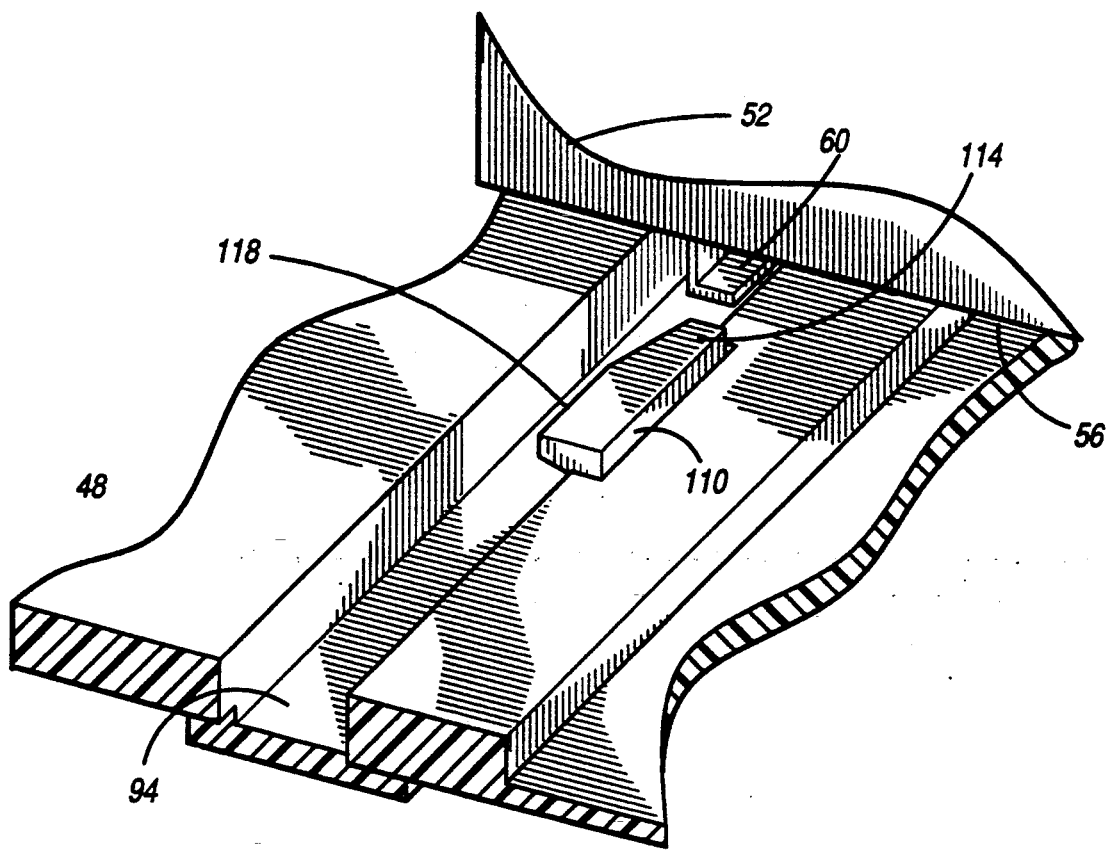
FIG. 3 is an enlarged, cut-away view of portions of the support assembly and a transceiver unit illustrating the connection therebetween.
Figure 4:
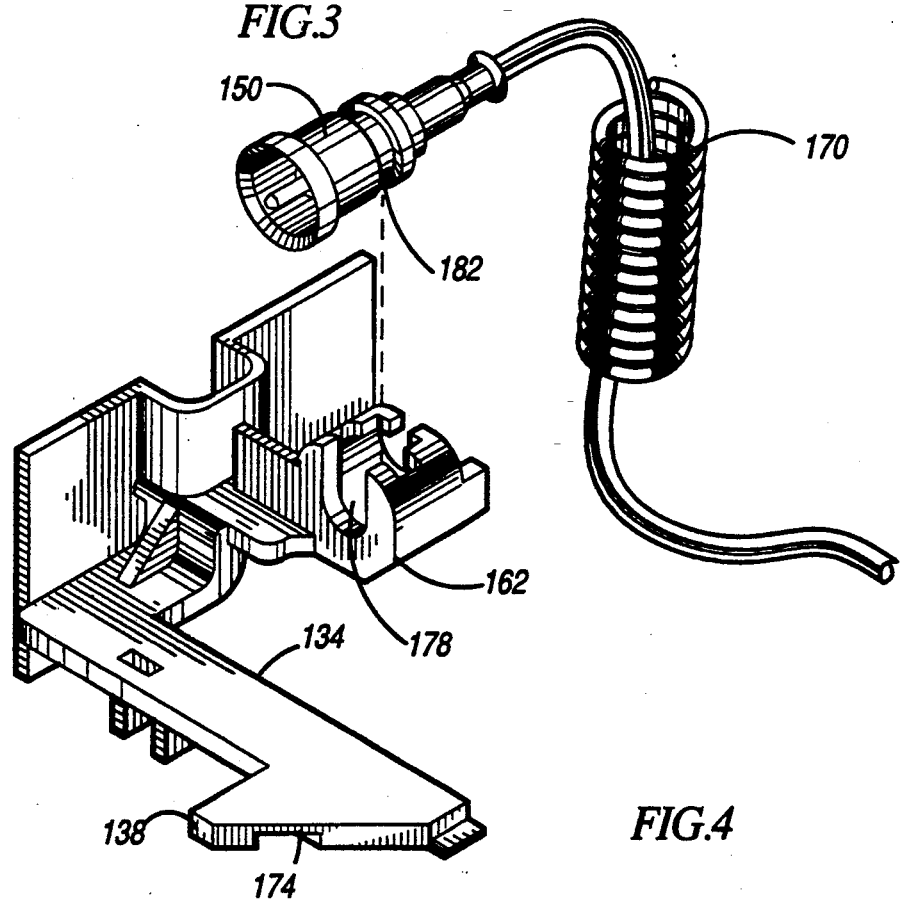
FIG. 4 is an enlarged, exploded view of the latch forming a portion of the transportable support assembly of the present invention.

Turning now to the enlarged view of FIG. 3, a portion of surface 48 of bottom portion 20 of the support assembly 10 is illustrated. Positioned above surface 48 is a portion of transceiver unit 52. FIG. 4 illustrates the relationship between longitudinally-extending groove 94 formed along surface 48 and longitudinally-extending track 60 formed upon surface 56 of the transceiver unit 52. Track 60 and groove 94 are of dimensions to permit mated engagement therebetween when surface 56 of transceiver unit 52 is positioned upon surface 48. Track 62 and groove 92 are similarly of dimensions to permit mated engagement therebetween. Gaps 60E, 60F, and 60G, shown in FIG. 1, which separate the tandemly-positioned track portions 60A-60D correspond in position and dimension with mounting tabs 110 to permit engagement between track 60 and groove 94. Once track 60 is suitably engaged with groove 94, sliding translation of the transceiver unit along the groove 94 is permitted. Because each track portion 60A-60D is of an L-shaped, cross-sectional configuration, translation of the transceiver unit 52 along groove 94 is permitted as bottom portions of track sections 60A-60D pass beneath bottom surfaces of mounting tabs 110 during translation of track 60 along groove 94. Side surfaces of portions 60A-60D abut against the angled, side surfaces 118 of the mounting tabs 110. Mounting tabs 110 do not span the opposing sidewalls which define groove 94, and continued translation of the transceiver unit 52 along groove 94 causes alignment of track portions 60A-60D of track 60 at a left-hand side of the groove 94. Because bottom portions of sections 60A-60D abut against bottom surfaces of mounting tabs 110 once the track 60 is translated along groove 94, mounting tabs 110 additionally support the transceiver unit 52 in position against the surface 48 of bottom portion 20. While not illustrated, the relationship between track 62 and groove 92 formed to extend longitudinally along surface 48 is merely a mirror image of FIG. 3 with appropriate substitution of reference numerals. Mounting tabs 98 are formed in a similar manner to form the same functions as mounting tabs 110.

Referring again to the cut-away, exploded view of FIG. 2, bottom portion 20 of support assembly 10 is further shown to form sidewall 122 which defines a backwall of the transceiver unit receiving platform 44. Sidewall 122 extends vertically above the plane of surface 48 to limit translation of transceiver unit 52 along grooves 92 and 94 when tracks 60 and 62 are engaged therewith. Mounted upon sidewall 122 is connector element 126 which, similar to connector element 70 of transceiver unit 52 (shown in FIG. 1), is preferably comprised of a conventional, RS-232 connector. Connector element 126 permits mated engagement with connector element 70 of transceiver unit 52 when transceiver unit 52 is translated such that face surface 66 of unit 52 abuts against sidewall 122. When connector elements 70 and 126 are suitably connected theretogether, the transmit/receive circuitry contained within the housing of transceiver unit 52 may be connected to both a battery power supply inserted within battery receiving chamber 36 of FIG. 1, and a handset suitably connected to appropriate connections positioned within opening 32 (shown in FIG. 1). Spring element or elements 128 are additionally mounted upon sidewall 122 for exerting a spring force against face surface 66 of transceiver unit 52 when the transceiver unit abuts thereagainst. Spring elements 128 of FIG. 2 are comprised of leaf springs; alternately, however, other spring constructions may similarly be mounted upon sidewall 122 for exerting a spring force against face surface 66 of transceiver unit 52.

Latch element 134 having a hooked projection 138 forming an angled, force receiving surface 142 is operative to span the gap separating the sidewalls which define groove 92. A depression formed upon surface 48 permits extension of a tip-portion of hooked projection 138 beyond the sidewall defining groove 92. Latch element 134 is permitted translation in the direction indicated by arrow 146. When tracks 60 and 62 are suitably engaged by grooves 92 and 94, and translated therealong an end surface of track 62 abuts against force receiving surface 142 of latch element 134. Because latch element 134 is permitted translation in the direction indicated by arrow 146, forces exerted upon force receiving surface 142 causes translation of latch element 134 in the direction indicated by arrow 146. Continued exertion of force against force receiving surface 142 causes continued translation of latch element 134 in the direction indicated by arrow 146 until the hooked projection 138 of latch element 134 is no longer positioned within the groove 92. An end surface of track portion 62D abuts against force receiving surface 142 as the track 62 is translated along groove 92. Forces caused by such translation are transmitted to force receiving surface 142 which, in turn, causes translation of latch member 134 in the direction of arrow 146 until hooked projection 138 is translated out of groove 92. Unrestricted translation of transceiver unit 52 is thereafter permitted until face surface 66 of the unit 52 abuts against sidewall 122.

The lengths of the tandemly positioned track portions 60A–60D and 62A–62D, and gaps 60E–60G and 62E–62G are carefully selected such that when face surface 66 of transceiver unit 52 abuts against sidewall 122 of bottom portion 20, hooked projection 138 of latch element 134 is aligned with a gap separating the tandemly-positioned track portions. In particular, when face surface 66 abuts against sidewall 122, gap 62G separating track portions 62C and 62D is aligned with hooked projection 138. When hooked projection 138 is inserted to extend into the gap 62G, latch element 134 latches the transceiver unit 52 in position thereat. When support assembly 10 is horizontally positioned, transceiver unit 52 is supported upon top surfaces 102 and 114 of mounting tabs 98 and 110 and latched in position thereat by latch element 134. When support assembly 10 is positioned in different orientations, the transceiver unit 52 is supported against other portions of mounting tabs 98 and/or 110, but similarly latched in position thereat by latch element 134. For example, when support assembly 10 is vertically positioned, side surfaces of track 60 abut against side surfaces 106 of mounting tabs 98. Latch element 134 affixes the transceiver unit 52 in position such that the unit 52 is supported against side surfaces of mounting tabs 98 and/or 110.

FIG. 2 further illustrates the antenna coupler 150 which, as illustrated, is preferably cup-shaped to permit mated engagement with antenna connector 78 formed on side surface 74 of transceiver unit 52. Antenna coupler 150 is supported by a vertically-projecting flange of latch element 134. Translation of latch element 134 in the direction indicated by arrow 146 in FIG. 2 causes corresponding translation of the flanged portion thereof and antenna coupler 150 supported to project therefrom.

An opening formed in sidewall 154 of transceiver unit receiving platform 44 permits translation of antenna coupler 150 into and out of the area defined by receiving platform 44. An opening is additionally formed on top surface 160 of bottom portion 20 to permit vertical positioning of the transceiver unit 52 having the antenna connector 78 projecting from a side face surface thereof upon surface 48. Once tracks 60 and 62 of transceiver unit 52 are aligned with grooves 94 and 92, respectively, formed on surface 48 of portion 20, and the transceiver unit is translated such that face surface 66 abuts against sidewall 122, latch 134 latches the transceiver unit in position, and the antenna coupler 150 matingly engages with antenna connector 78 formed on the side, face surface 74 of transceiver unit 52. Antenna coupler 150 is coupled to an antenna to connect thereby the antenna with the internal, transmit/receive circuitry contained within receiver unit 52 when coupler 150 is matingly engaged with antenna connector 78.

FIG. 4 is an enlarged view of latch element 134. The view of FIG. 4 better illustrates the latch element 134 having hooked projection 138. FIG. 4 further illustrates spring element 170 positioned about antenna coupler 150. A back end of spring element 170 seats against a surface of top portion 15 (not shown in FIG. 4) of transportable support assembly 10. Spring element 170 exerts a spring force for translating latch element 134 such that hooked projection 138 thereof projects into gap 62G to latch transceiver unit 52 in position. Such force causing translation of latch element 134 similarly causes translation of antenna coupler 150 to position the coupler 150 in the mated engagement with antenna connector 78 of transceiver unit 52. Conversely, the translation forces exerted upon force receiving surface 142 of latch element 134 are transmitted to spring element 170 to compress spring element 170 thereby as latch element 134 is translated in the direction indicated by arrow 146 of FIG. 2.

FIG. 4 further illustrates hooked projection 138 which forms force receiving surface 142 for transmitting forces exerted upon the latch element 134 when the transceiver unit 52 abuts thereagainst. Flanged portion 162 of latch element 134 extends beneath the plane of the force receiving surface 142, and forms an opening 178 to support antenna coupler 150 thereat. FIG. 4 further illustrates enlarged views of the antenna coupler 150. Portion 182 of antenna coupler 150 is of reduced dimensions. Portion 182 is inserted through a gap separating opposing jaws formed of flange 162 of latch element 134 to position thereby portion 182 to extend through opening 178. The lengthwise dimensions of portion 182 are greater than the thickness of the flange 162 to permit limited movement of the antenna coupler 150. The limited movement permitted of antenna coupler 150 permits connection of coupler 150 with antenna connector 78 of transceiver unit 52 while avoiding the requirement of precisely positioning the transceiver unit 52 at the support position upon surface 48. The antenna coupler flange limits relative movement between the antenna coupler 150 and flanged portion 160 of latch element 134. The antenna coupler flange further provides a surface for seating of spring element 166 thereagainst.

The support assembly 10 of the present invention permits transceiver unit 52 to be affixed to assembly 10, a battery unit 198 to be inserted within battery receiving chamber 36, and handset 200 having cable 202 to be supported at handset receiving area formed by recessed area 24. An antenna, shown in hatch in FIG. 1, mounted upon a side surface of support assembly 10, projects above the assembly 10. When transceiver unit 52, a battery power source, handset, and antenna 204 are suitably interconnected, support assembly 10 together with the respective elements forms a transportable radiotelephone. A user may conveniently carry the entire transportable radiotelephone by grasping handle 40 which forms a hand-hold. Because transceiver unit 52 is connected to the other elements of the radiotelephone merely by positioning the unit 52 at a support position upon the transceiver unit receiving platform 44, the transportable radiotelephone may be formed quickly and easily by a user by merely plugging the respective elements in proper position. A transceiver unit and handset of a mobile phone may be removed from a vehicle and quickly affixed to the support assembly 10 of the present invention, thereby to form a transportable, cellular phone.

While the present invention has been described in connection with the preferred embodiment shown in the various figures, it is to be understood that other similar embodiments may be used and modifications and additions may be made to the described embodiment for performing the same functions of the present invention without deviating therefrom. Therefore, the present invention should not be limited to any single embodiment, but rather construed in breadth and scope in accordance with the recitation of the appended claims.

What is claimed is:

1. A transportable support assembly for releasably affixing a transceiver unit thereto, the transceiver unit having a bottom mounting surface extending in a first planar direction and at least one side surface extending in a second planar direction dissimilar with that of the first planar direction, the at least one side surface having an interface element positioned thereat, said transportable support assembly comprising:
   a support surface for receiving the bottom mounting surface of the transceiver unit thereupon and for permitting sliding translation of the transceiver unit therealong to position the transceiver unit at a support position;
   a latch member positioned upon the support surface and translatable thereupon into a latching position whereat the latch member latching engages the transceiver unit when the transceiver unit is translated into the support position to latch the transceiver unit in position thereat; and
   an interface connector coupled to the latch member to be translatable in unison therewith, said interface connector for engaging with the interface element positioned at the side surface of the transceiver unit when the transceiver unit is positioned at the support position and for disengaging the interface element when the transceiver unit is positioned beyond the support position.

2. The transportable support assembly of claim 1 further comprising means forming at least one groove extending along at least a portion of said support surface for engaging with at least one track formed upon the bottom mounting surface of the transceiver unit such that, when said track formed upon the bottom mounting surface of the transceiver unit is positioned in a confronting relationship with the groove formed to extend along a portion of the support surface, sliding translation of the transceiver unit along the groove positions the transceiver unit at the support position.

3. The transportable support assembly of claim 2 further comprising at least one tabular member formed to extend into the groove extending along the at least the portion of the support surface for guiding the at least one track of the transceiver unit therealong, thereby to guide the transceiver unit into the support position.

4. The transportable support assembly of claim 1 wherein said latch member further includes a hooked projection forming a force receiving surface for receiving an actuation force to cause translation of the latch member responsive to application of the actuation force thereto for alternately positioning the latch member in latching engagement with the transceiver unit or out of latching engagement with the transceiver unit.

5. The transportable support assembly of claim 1 wherein the support surface further comprises a recessed area forming a latch receiving area for positioning of at least a portion of the latch member therein.

6. The transportable support assembly of claim 5 further comprising means forming a spring for exerting a spring force upon the latch member.

7. The transportable support assembly of claim 1 wherein the interface element of the transceiver unit is comprised of an antenna lead and said interface connector is comprised of an antenna coupler for coupling with the antenna lead of the transceiver unit when the transceiver unit is positioned at the support position.

8. The transportable support assembly of claim 7 further comprising an antenna connected to the antenna coupler.

9. The transportable support assembly of claim 1 further comprising means for supporting a transceiver handset therefrom.

10. The transportable support assembly of claim 9 further comprising means for connecting the transceiver handset and the transceiver unit theretogether.

11. The transportable support assembly of claim 10 wherein said means for connecting the transceiver handset and the transceiver unit connects the transceiver handset and the transceiver unit theretogether when the transceiver unit is positioned at the support position, and disconnects the transceiver handset and the transceiver unit when the transceiver unit is released from the support position and moved thereaway.

12. The transportable support assembly of claim 1 further comprising means, extending beyond the support surface, for supporting a battery element.

13. The transportable support assembly of claim 12 further comprising means for connecting the battery element, when positioned at the means for supporting the battery element, and the transceiver unit theretogether.

14. The transportable support assembly of claim 13 wherein said means for connecting the battery element and the transceiver unit connects the battery element and the transceiver unit theretogether when the transceiver unit is positioned at the support position, and disconnects the battery element and the transceiver unit the transceiver unit is released from the support position and moved thereaway.

15. The transportable support assembly of claim 1 further comprising a handle coupled to extend beyond the support surface for forming a handhold facilitating carriage of the transceiver unit by the user thereby.

16. The transportable support assembly of claim 1 wherein said support surface is comprised of a thermoplastic material.

17. The transportable support assembly of claim 1 wherein said latch member is comprised of a thermoplastic material.

18. A transportable support assembly for releasably affixing a transceiver unit thereto, the transceiver unit having a bottom mounting surface extending in a first planar direction and at least one side surface extending in a second planar direction dissimilar with that of the first planar direction, the at least one side surface having an antenna connector positioned thereat said transportable support assembly further supporting a telephonic handset, a battery, and an antenna therefrom, said transportable support assembly comprising:

- a support surface for receiving the bottom mounting surface of the transceiver unit thereupon and for permitting sliding translation of the transceiver unit therealong to position the transceiver unit at a support position;
- a latch member positioned upon the support surface and translatable thereupon into a latching position whereat the latch member latching engages the transceiver unit when the transceiver unit is translated into the support position to latch the transceiver unit in position thereat; and
- an antenna coupler coupled to the latch member to be translatable in unison therewith, said antenna coupler for engaging with the antenna connector positioned at the side surface of the transceiver unit when the transceiver unit is positioned at the support position and for disengaging the antenna connector when the transceiver unit is positioned beyond the support position.

19. A transportable telephone comprising:

- a transceiver unit having a bottom mounting surface extending in a first planar direction and at least one side surface extending in a second planar direction dissimilar with that of the first planar direction, the at least one side surface having an antenna connector positioned thereat;
- a transceiver handset releasably coupled to the transceiver unit and operative to receive signals from, and to supply signals to, the transceiver unit;
- a battery releasably coupled to the transceiver unit for supplying electrical power thereto; and
- a support assembly having: a support surface for receiving the bottom mounting surface of the transceiver unit thereupon and for permitting sliding translation of the transceiver unit therealong to position the transceiver unit at a support position; a latch member positioned upon the support surface and translatable thereupon into a latching position whereat the latch member latching engages the transceiver unit when the transceiver unit is translated into the support position to latch the transceiver unit in position thereat; and an antenna coupler coupled to the latch member to be translatable in unison therewith, said antenna coupler for engaging with the antenna connector positioned at the side surface of the transceiver unit when the transceiver unit is positioned at the support position and for disengaging the antenna connector when the transceiver unit is positioned beyond the support position.

* * * * *